(12) United States Patent
Kim et al.

(10) Patent No.: US 8,971,793 B2
(45) Date of Patent: Mar. 3, 2015

(54) APPARATUS AND METHOD FOR TRANSMITTING AND RECEIVING DATA IN A COMMUNICATION SYSTEM

(75) Inventors: Yong-Seok Kim, Suwon-si (KR); Jae-Hee Cho, Seoul (KR); Kwan-Hee Roh, Hwaseong-si (KR); Soon-Young Yoon, Seoul (KR); June Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 970 days.

(21) Appl. No.: 12/258,858

(22) Filed: Oct. 27, 2008

(65) Prior Publication Data

US 2009/0111376 A1 Apr. 30, 2009

(30) Foreign Application Priority Data

Oct. 30, 2007 (KR) ........................ 10-2007-0109744

(51) Int. Cl.
*H04B 3/36* (2006.01)
*H04B 7/26* (2006.01)
*H04W 16/26* (2009.01)

(52) U.S. Cl.
CPC ............. *H04B 7/2606* (2013.01); *H04W 16/26* (2013.01)
USPC .................................. 455/7; 455/9; 455/13.1

(58) Field of Classification Search
USPC ........ 455/7, 11.1, 13.1, 524, 422.1, 419, 444, 455/10, 15, 433, 518, 502, 428, 505, 561, 455/562.1, 456.1, 453, 554.1, 9; 370/229, 370/329, 280, 335, 338, 390, 279, 293, 325, 370/328, 337, 315
See application file for complete search history.

(56) References Cited

U.S. PATENT DOCUMENTS

| | | | |
|---|---|---|---|
| 2004/0071128 A1* | 4/2004 | Jang et al. ...................... 370/349 |
| 2004/0266339 A1* | 12/2004 | Larsson ............................ 455/7 |
| 2006/0046643 A1* | 3/2006 | Izumikawa et al. ............... 455/7 |
| 2006/0105709 A1* | 5/2006 | Oh et al. ...................... 455/13.1 |
| 2006/0153132 A1* | 7/2006 | Saito ............................. 370/329 |
| 2007/0104223 A1* | 5/2007 | Lee et al. ...................... 370/470 |
| 2007/0135039 A1* | 6/2007 | Yi et al. ....................... 455/11.1 |
| 2007/0149118 A1* | 6/2007 | Kang et al. .................. 455/11.1 |
| 2007/0153734 A1* | 7/2007 | Lee et al. ...................... 370/329 |
| 2007/0155315 A1* | 7/2007 | Lee et al. .................... 455/11.1 |
| 2007/0160014 A1* | 7/2007 | Larsson ........................ 370/338 |
| 2007/0178831 A1* | 8/2007 | Takeda et al. ..................... 455/7 |
| 2007/0183321 A1* | 8/2007 | Takeda et al. ................. 370/229 |
| 2007/0201400 A1* | 8/2007 | Kang et al. .................... 370/329 |
| 2007/0280172 A1* | 12/2007 | Tan et al. ...................... 370/335 |
| 2008/0070582 A1* | 3/2008 | Cai ................................ 455/450 |
| 2008/0085677 A1* | 4/2008 | Sheen et al. ....................... 455/7 |
| 2008/0219229 A1* | 9/2008 | Zheng ........................... 370/338 |

FOREIGN PATENT DOCUMENTS

WO 2004/107694 A1 12/2004
WO WO 2007036161 * 4/2007

* cited by examiner

*Primary Examiner* — Golam Sorowar
(74) *Attorney, Agent, or Firm* — Jefferson IP Law, LLP

(57) ABSTRACT

An apparatus and method for transmitting and receiving data in a communication system are provided. In the method, a BS selects a repeater group from among a plurality of repeater groups, for use in transmitting first data to an MS and transmits the first data to the MS according to the number of repeaters of the selected repeater group. The first data is different from data transmitted by the repeaters of the selected repeater group.

24 Claims, 13 Drawing Sheets

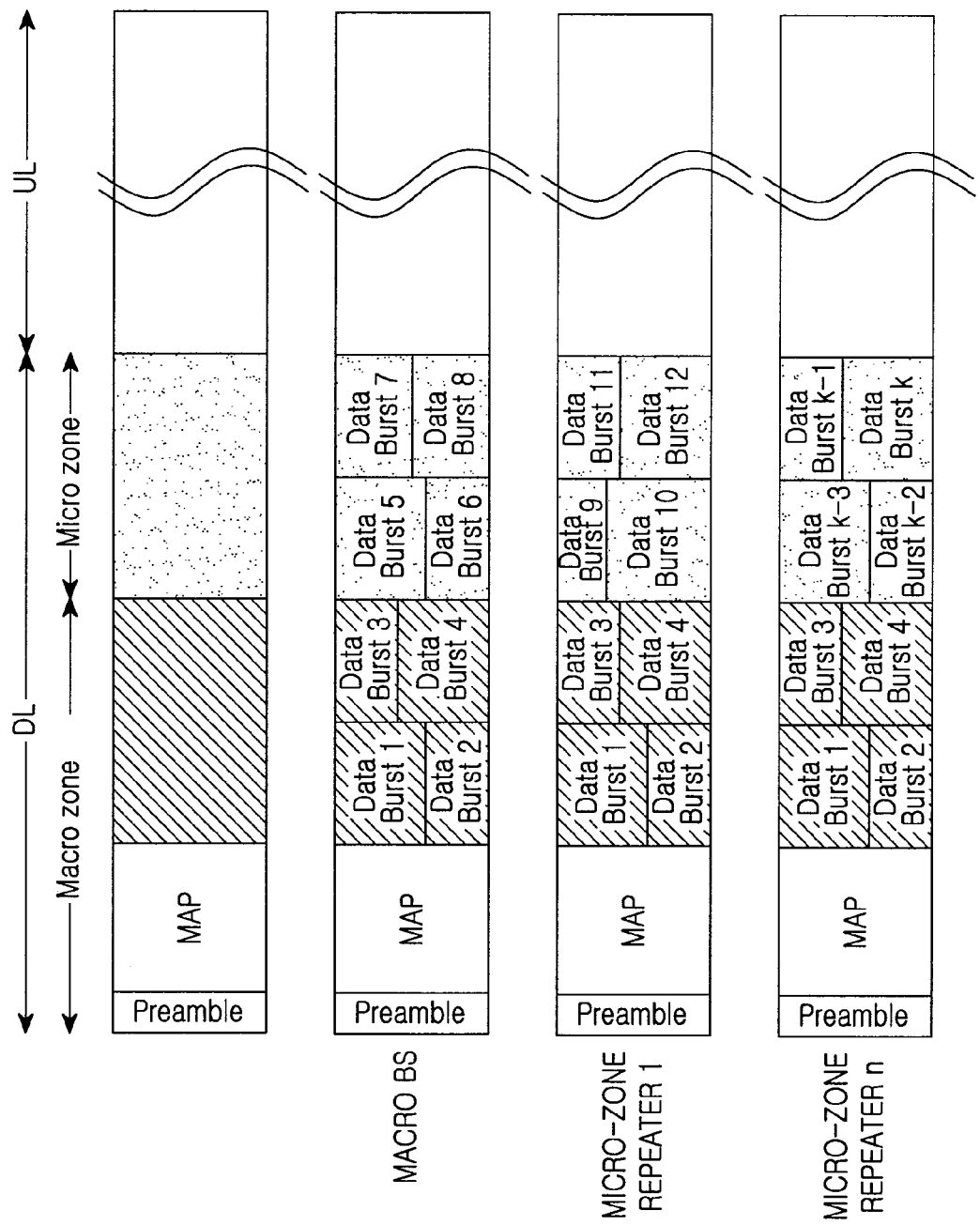

APPARATUS AND METHOD FOR TRANSMITTING AND RECEIVING DATA IN A COMMUNICATION SYSTEM

PRIORITY

This application claims the benefit under 35 U.S.C. §119 (a) of a Korean patent application filed in the Korean Intellectual Property Office on Oct. 30, 2007 and assigned Serial No. 10-2007-0109744, the entire disclosure of which is hereby incorporated by reference.

BACKGROUND OF THE INVENTION

1. Field of the Invention

The present invention relates to data transmission and reception in a communication system. More particularly, the present invention relates to an apparatus and method for transmitting and receiving data in a communication system using repeaters.

2. Description of the Related Art

In a communication system, a Base Station (BS) transmits and receives data to and from a Mobile Station (MS) via a direct link. Due to the fixedness of the BS, a shadowing area may exist within the coverage area of the BS or channel status may fluctuate. Therefore, the communication system has limitations in efficiently providing a communication service. To avert this problem, the communication system employs repeaters for amplification and coverage expansion of signals from the BS.

The use of repeaters expands a cell coverage area and provides a better channel to an MS. In addition, the BS can provide a high-speed data channel to an MS at a cell boundary that worsens the channel status via the repeater.

In the communication system, the BS can use repeaters for data transmission and reception to and from the MS. With reference to FIG. 1, the structure of frames transmitted from a BS and repeaters will be described below.

FIG. 1 illustrates a frame structure for data transmission and reception of a BS and repeaters in a conventional communication system.

The communication system comprises a BS, an MS, and repeaters for relaying signals between the BS and the MS.

Referring to FIG. 1, when the BS transmits and receives data to and from the MS, each frame transmitted from the BS and the repeaters, Repeater 1 to Repeater n comprises DownLink (DL) and UpLink (UL) areas.

The DL area comprises a preamble, a MAP, and data bursts. The preamble delivers a synchronization signal for synchronization acquisition. The MAP comprises data restoration information for restoring the data of the data bursts. The data bursts carry the transmission data.

The frames transmitted from the BS and the repeaters are configured to transmit the same data simultaneously. In this context, there exists a need for developing a technique for increasing overall system capacity through efficient use of resources in a system having a BS and repeaters.

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting and receiving data in a communication system.

Another aspect of the present invention is to provide an apparatus and method for transmitting and receiving data in a communication system using repeaters.

A further aspect of the present invention is to provide an apparatus and method for transmitting and receiving data to increase system capacity in a communication system using repeaters.

Still another aspect of the present invention is to provide an apparatus and method for transmitting and receiving data to reduce interference between repeaters during data transmission and reception in a communication system using repeaters.

In accordance with an aspect of the present invention, a method for transmitting data in a BS in a communication system is provided. In the method, a repeater group is selected from among a plurality of repeater groups, for use in transmitting first data to an MS and the first data is transmitted to the MS according to the number of repeaters of the selected repeater group. The first data is different from data transmitted by the repeaters of the selected repeater group.

In accordance with another aspect of the present invention, a method for receiving data in an MS in a communication system is provided. In the method, first data transmitted by a BS is received from repeaters of a repeater group. The repeater group is selected from among a plurality of repeater groups, for transmission of the first data by the BS, the first data is received according to the number of the repeaters of the selected repeater group, and the first data received from the repeaters of the selected repeater group is different according to the repeaters of the selected repeater group.

In accordance with a further aspect of the present invention, an apparatus for transmitting data in a communication system is provided. The apparatus comprises a BS that selects a repeater group from among a plurality of repeater groups, for use in transmitting first data to an MS, and transmits the first data to the MS according to the number of repeaters of the selected repeater group. The first data is different from data transmitted by the repeaters of the selected repeater group.

In accordance with still another aspect of the present invention, an apparatus for receiving data in a communication system is provided. The apparatus comprises an MS that receives first data transmitted by a BS from repeaters of a repeater group. The repeater group is selected from among a plurality of repeater groups, for transmission of the first data by the BS, the first data is received according to the number of the repeaters of the selected repeater group, and the first data received from the repeaters of the selected repeater group is different according to the repeaters of the selected repeater group.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 3A illustrates a Time Division Multiplexing (TDM) frame structure in a communication system according to an exemplary embodiment of the present invention;

Throughout the drawings, the same drawing reference numerals will be understood to refer to the same elements, features and structures.

DETAILED DESCRIPTION OF EXEMPLARY EMBODIMENTS

Figure 1:
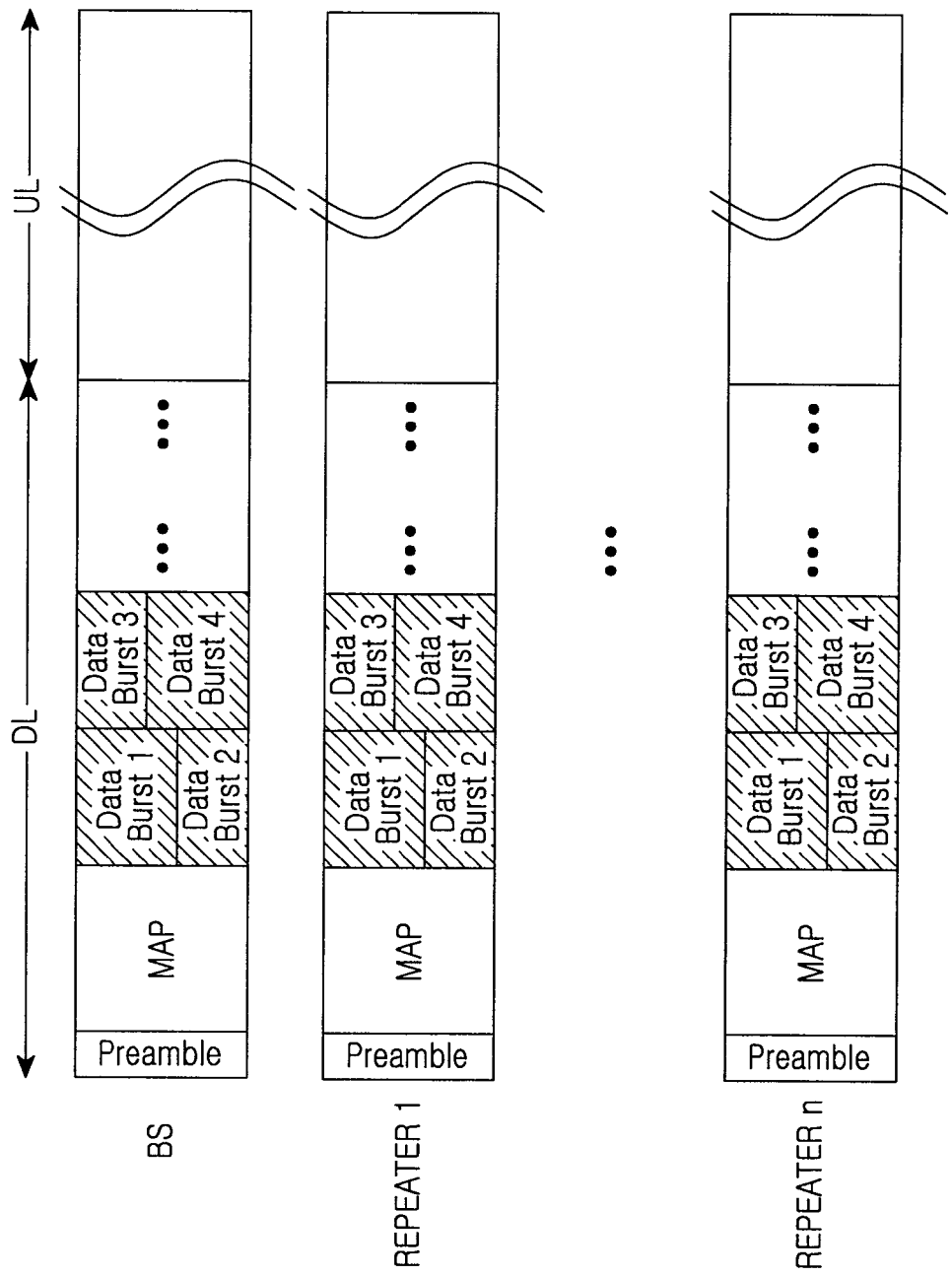
FIG. 1 illustrates a frame structure for data transmission and reception of a BS and repeaters in a conventional communication system.

The following description with reference to the accompanying drawings is provided to assist in a comprehensive understanding of exemplary embodiments of the invention as defined by the claims and their equivalents. It comprises various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions are omitted for clarity and conciseness.

Exemplary embodiments of the present invention provide an apparatus and method for transmitting and receiving data in a communication system, for example, a communication system using repeaters. In accordance with exemplary embodiments of the present invention, a BS and at least one repeater connected to the BS transmit data in separate zones of a frame depending on whether the data is the same or different in the communication system. While the following description is made in the context of a repeater that relays a signal from the BS, for the sake of convenience, it is to be understood that the present invention is also applicable to other devices and methods for relaying signals from a BS. For the sake of convenience, a BS and a repeater are referred to as a macro BS and a micro-zone repeater, respectively.

In the following description of exemplary embodiments of the present invention, the term "macro zone: refer to an area in which a macro BS and micro-zone repeaters can transmit the same data simultaneously and the term "micro zone" refer to an area in which the macro BS and the micro-zone repeaters can transmit the same or different data simultaneously.

A micro zone may comprise an area in which the macro BS and a micro-zone repeaters can transmit data to a particular MS in cooperation. Therefore, the macro BS and the micro-zone repeaters can transmit the same or different data to the MS in cooperation.

The micro zone is divided into at least two areas. In a first area, the macro BS and the micro-zone repeaters transmit different data. In the second area, the macro BS and the micro-zone repeaters transmit the same data.

In an exemplary embodiment, a transmission frame can be divided into a zone in which the macro BS and the micro-zone repeaters transmit different data and a zone in which they transmit the same data in cooperation.

For example, if the sizes of the macro zone and the micro zone are flexible, the Carrier-to-Interference and Noise Ratios (CINRs) of every MS is measured in the macro zone and the micro zone and Proportional Fairness (PF) metrics for the macro zone and the micro zone are calculated for the MS. Then MSs are allocated to the macro zone or the micro zone in a descending order of PF metrics. In this manner, users are automatically selected for the macro zone and the micro zone. On the other hand, if the macro zone and the micro zone are of fixed sizes, users are selected on a zone basis.

Figure 2:
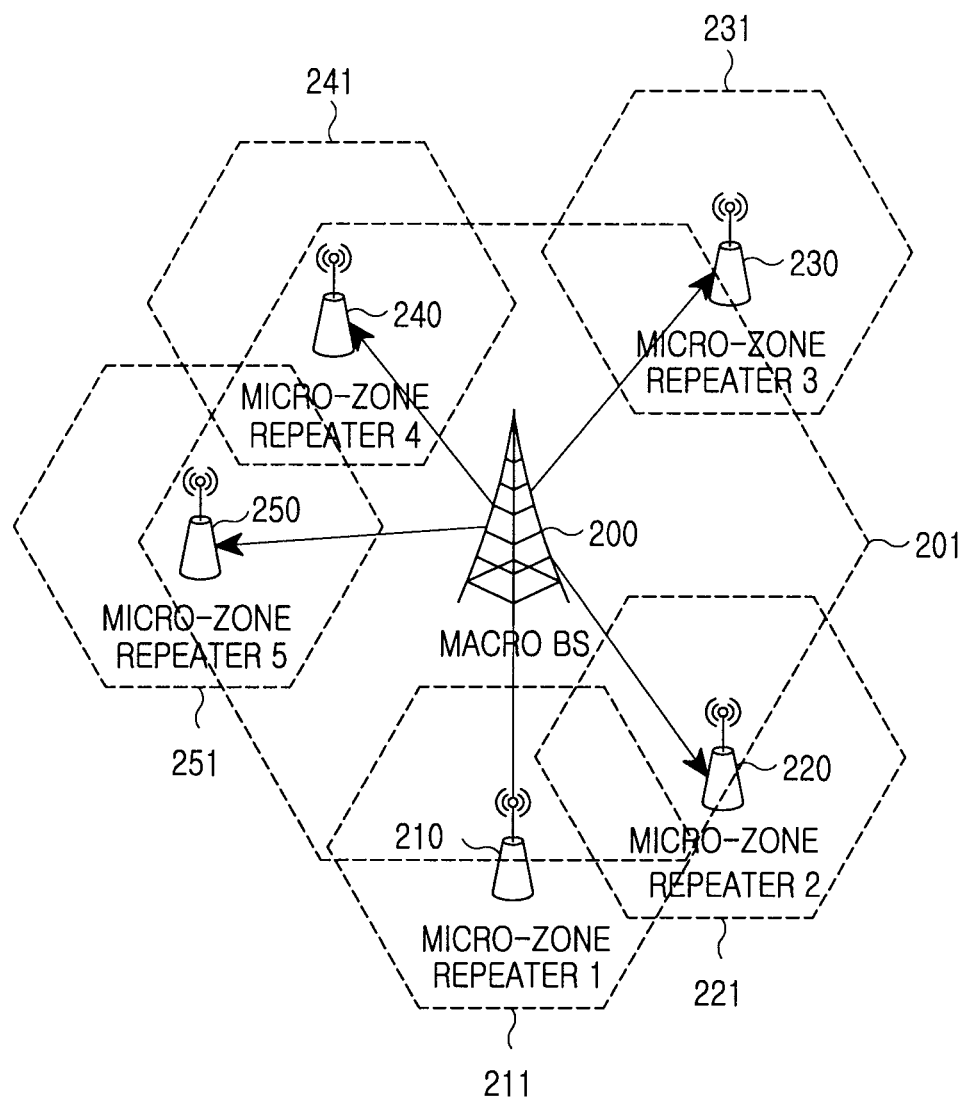
FIG. 2 illustrates a configuration of a communication system according to an exemplary embodiment of the present invention.

FIG. 2 illustrates a configuration of a communication system according to an exemplary embodiment of the present invention.

Referring to FIG. 2, the communication system comprises a macro BS 200 and a plurality of (first to fifth) micro-zone repeaters 210, 220, 230, 240 and 250 connected to the macro BS 200. The macro BS 200 covers a macro cell 201 and the first to fifth micro-zone repeaters 210, 220, 230, 240 and 250 cover first to fifth micro cells 211, 221, 231, 241 and 251, respectively.

The macro BS 200 and the micro-zone repeaters 210, 220, 230, 240 and 250 each can use a single antenna or multiple antennas. In addition, the macro BS 200 and the micro-zone repeaters 210, 220, 230, 240 and 250 can operate in at least one of Time Division Multiplexing (TDM) and Frequency Division Multiplexing (FDM).

The macro BS 200 divides a frame into a macro zone in which the macro BS 200 and the micro-zone repeaters 210, 220, 230, 240 and 250 transmit the same data and a micro zone in which they transmit different data. The macro zone and the micro zone are determined by the macro BS 200 depending on system situations or setting, for example. Once MSs are selected for data communication, the macro zone and the micro zone can be automatically determined according to an exemplary embodiment of the present invention.

The macro BS 200 controls such that the macro BS 200 and the micro-zone repeaters 210, 220, 230, 240 and 250 transmit data discriminately in each frame.

Now frame structures for data transmission from the macro BS and the micro-zone repeaters will be described with reference to FIGS. 3A and 3B.

FIG. 3A illustrates a TDM frame structure in a communication system according to an exemplary embodiment of the present invention.

Referring to FIG. 3A, the frame structure is for frames transmitted from the macro BS and the micro-zone repeaters. Each of the frames comprises a DownLink (DL) area and an UpLink (UL) area. The DL area comprises a macro zone and a micro zone. The macro zone comprises a preamble, a MAP, and data bursts and the micro zone delivers data bursts.

Since the macro BS and the micro-zone repeaters use TDM frames, the data burst area of the macro zone is distinguished from that of the micro zone in time.

Hence, in the macro zone, the macro BS and the micro-zone repeaters transmit the same first to fourth data bursts. Meanwhile, in the micro zone, the macro BS transmits fifth to eighth data bursts, a first micro-zone repeater transmits ninth to twelfth data bursts, and an $n^{th}$ micro-zone repeater transmits $(k-3)^{th}$ to $k^{th}$ data bursts.

Figure 3B:
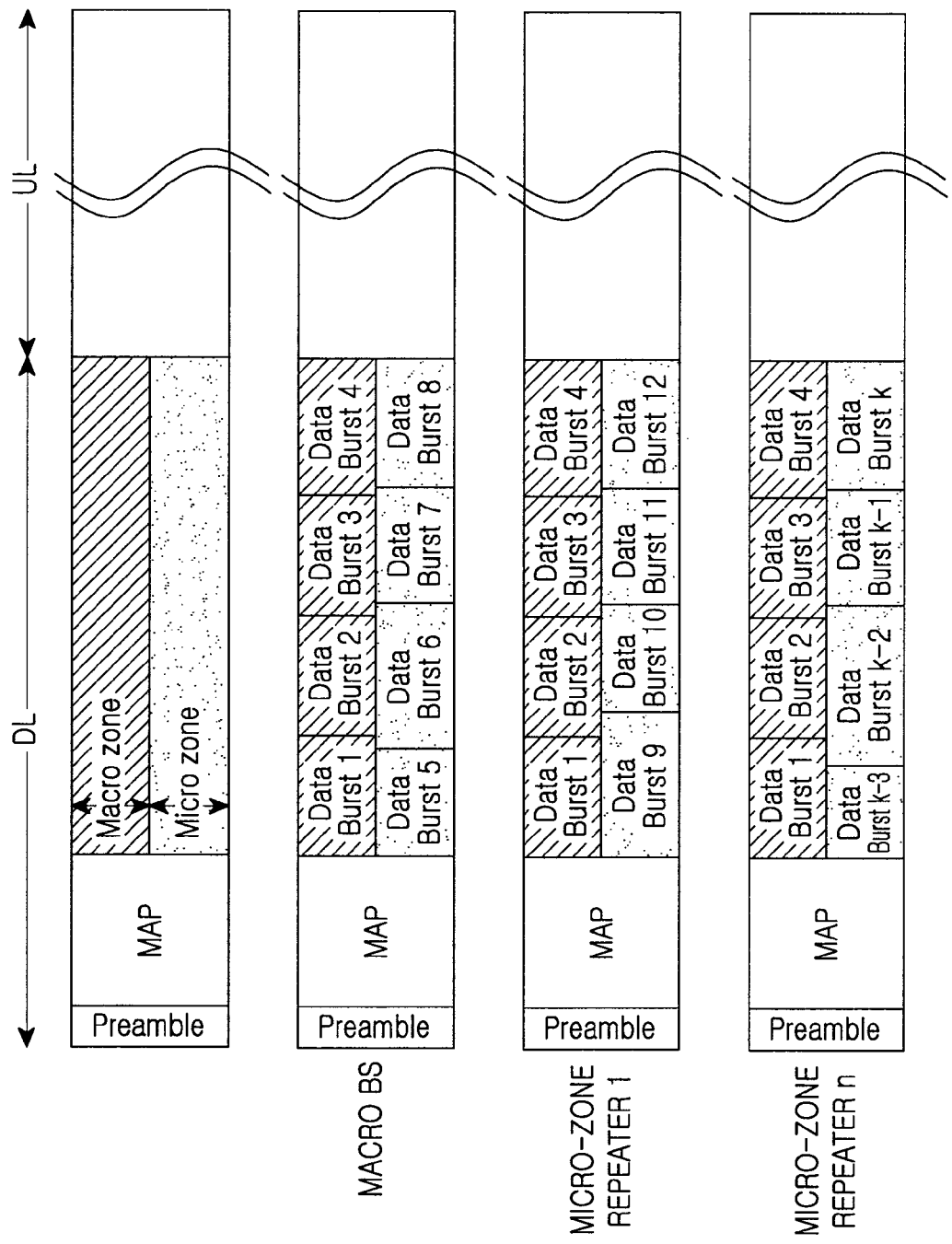
FIG. 3B illustrates a Frequency Division Multiplexing (FDM) frame structure in a communication system according to an exemplary embodiment of the present invention.

FIG. 3B illustrates an FDM frame structure in a communication system according to an exemplary embodiment of the present invention.

Referring to FIG. 3B, the frame structure is for frames transmitted from the macro BS and the micro-zone repeaters. Each of the frames comprises a DL area and a UL area. The DL area comprises a macro zone and a micro zone. The macro zone comprises a preamble, a MAP, and data bursts and the micro zone delivers data bursts.

Since the macro BS and the micro-zone repeaters use FDM frames, the data burst area of the macro zone is distinguished from that of the micro zone in frequency.

Hence, in the macro zone, the macro BS and the micro-zone repeaters transmit the same first to fourth data bursts. Meanwhile, in the micro zone, the macro BS transmits fifth to eighth data bursts, a first micro-zone repeater transmits ninth to twelfth data bursts, and an $n^{th}$ micro-zone repeater transmits $(k-3)^{th}$ to $k^{th}$ data bursts.

A description will be made of the configuration of a BS for generating a frame divided into a macro zone and a micro zone with reference to FIG. 4.

Figure 4:
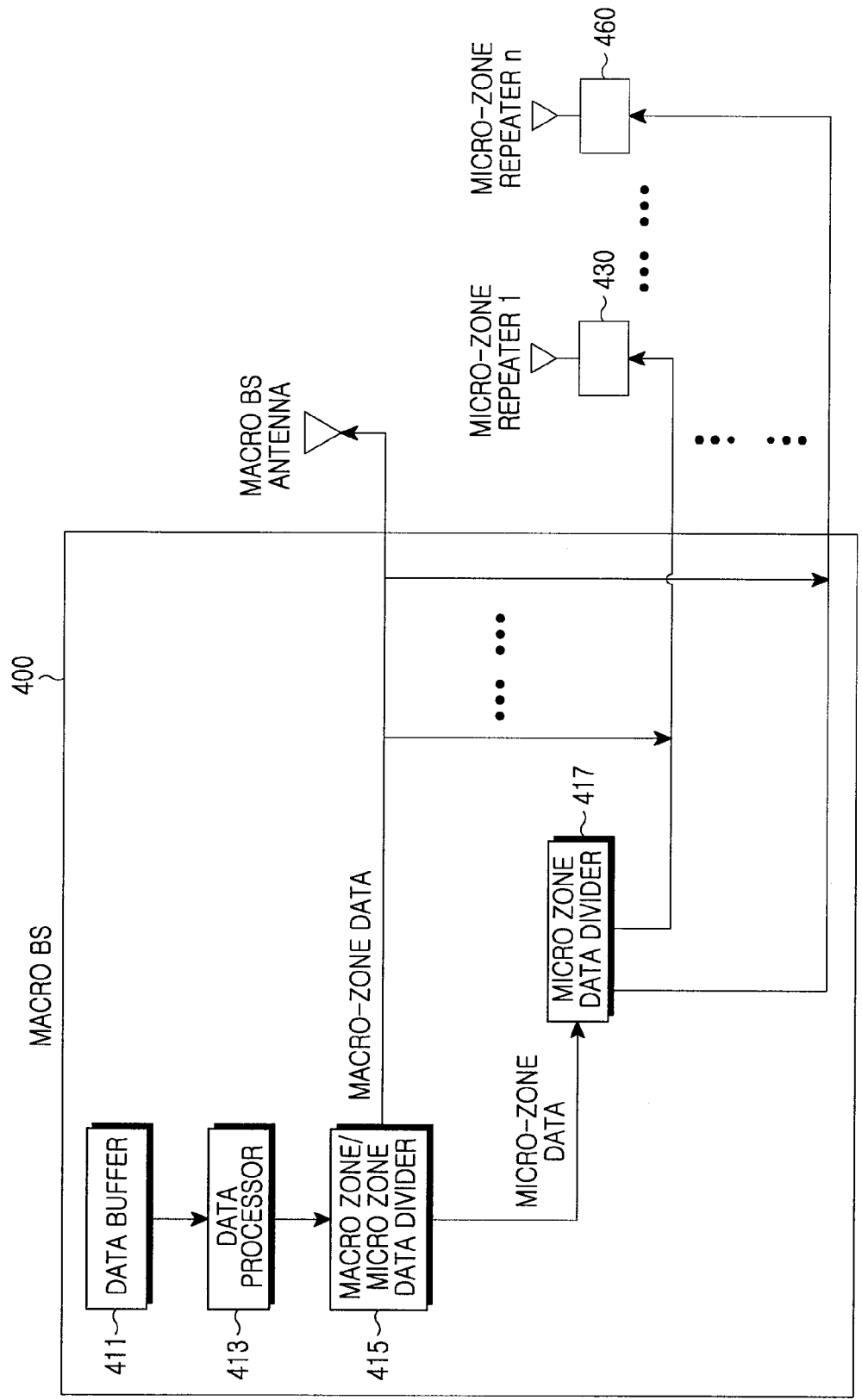
FIG. 4 is a block diagram of a macro Base Station (BS) in a communication system according to an exemplary embodiment of the present invention.

FIG. 4 is a block diagram of a macro BS in a communication system according to an exemplary embodiment of the present invention.

Referring to FIG. 4, the communication system comprises a macro BS 400 and first to $n^{th}$ micro-zone repeaters 430 to 460. The macro BS 400 can be connected to the first to $n^{th}$ micro-zone repeaters 430 to 460 wirelessly or by cable. In the illustrated case of FIG. 4, the macro BS 400 is connected to the first to $n^{th}$ micro-zone repeaters 430 to 460 by cable.

The macro BS 400 comprises a data buffer 411, a data processor 413, a macro zone/micro zone data divider 415, and a micro zone data divider 417.

The data buffer 411 buffers data to be transmitted to an MS.

The data processor 413 processes the buffered transmission data. For example, the data processing comprises encoding and modulation.

The macro zone/micro zone data divider 415 divides the processed data into data for a macro zone and data for a micro zone in a frame. The macro zone/micro zone data divider 415 transmits the macro-zone data to an antenna of the macro BS 400 and the first to n repeaters 430 to 460, respectively. Also, the macro zone/micro zone data divider 415 provides the micro-zone data to the micro zone data divider 417.

The micro zone data divider 417 divides the received micro-zone data into micro-zone data for the macro BS 400 and respective micro-zone data for the first to $n^{th}$ micro-zone repeater 430 to 460 and transmits the divided micro-zone data to the antenna of the macro BS 400 and the first to $n^{th}$ repeaters 430 to 460, respectively.

For transmission of the micro-zone data the first to $n^{th}$ repeaters 430 to 460, the micro zone data divider 417 can use dedicated radio links or fiber/optic lines free of mutual interference among the antenna of the macro BS 400 and the antennas of the first to $n^{th}$ repeaters 430 to 460.

The macro BS 400 generates data frames for the macro BS 400 itself and for the first to $n^{th}$ repeaters 430 to 460. It can also determine the start positions of the micro zones of the frames, taking into account the sizes of transmission data.

While not shown, the macro BS has an apparatus for detecting, demodulating, and decoding data received through the macro-BS antenna and data received from the first to $n^{th}$ repeaters 430 to 460.

The macro BS may further comprise an apparatus for controlling the transmit power of the first to $n^{th}$ repeaters 430 to 460 to control interference among the micro-zone repeaters 430 to 460 and increase their reception rates. For instance, the macro BS 400 can control interference and increase the data reception rate of an MS by allocating high transmit power levels to micro-zone repeaters transmitting data and micro-zone repeaters far apart from other ones.

To communicate with the macro BS, the MS performs initial network entry to the macro BS. Upon turning on, the MS measures the signal strengths of adjacent macro BSs and selects the macro BS having the highest signal strength as its serving macro BS.

Alternatively, upon turning on, the MS measures the signal strengths of adjacent micro-zone repeaters and selects micro-zone repeaters having signal strengths higher than a predefined threshold. Then the MS generates a list of the selected micro-zone repeaters and selects a macro BS connected to most of the listed micro-zone repeaters as its serving macro BS.

The MS notifies the selected macro BS that it is the serving macro BS and carries out data transmission and reception with the serving macro BS.

The macro BS may determine whether to communicate with the MS directly or through micro-zone repeaters communicating with the macro BS. In other words, the macro BS selects the macro-BS antenna or micro-zone repeater antennas, for communication with the MS.

Figure 5:
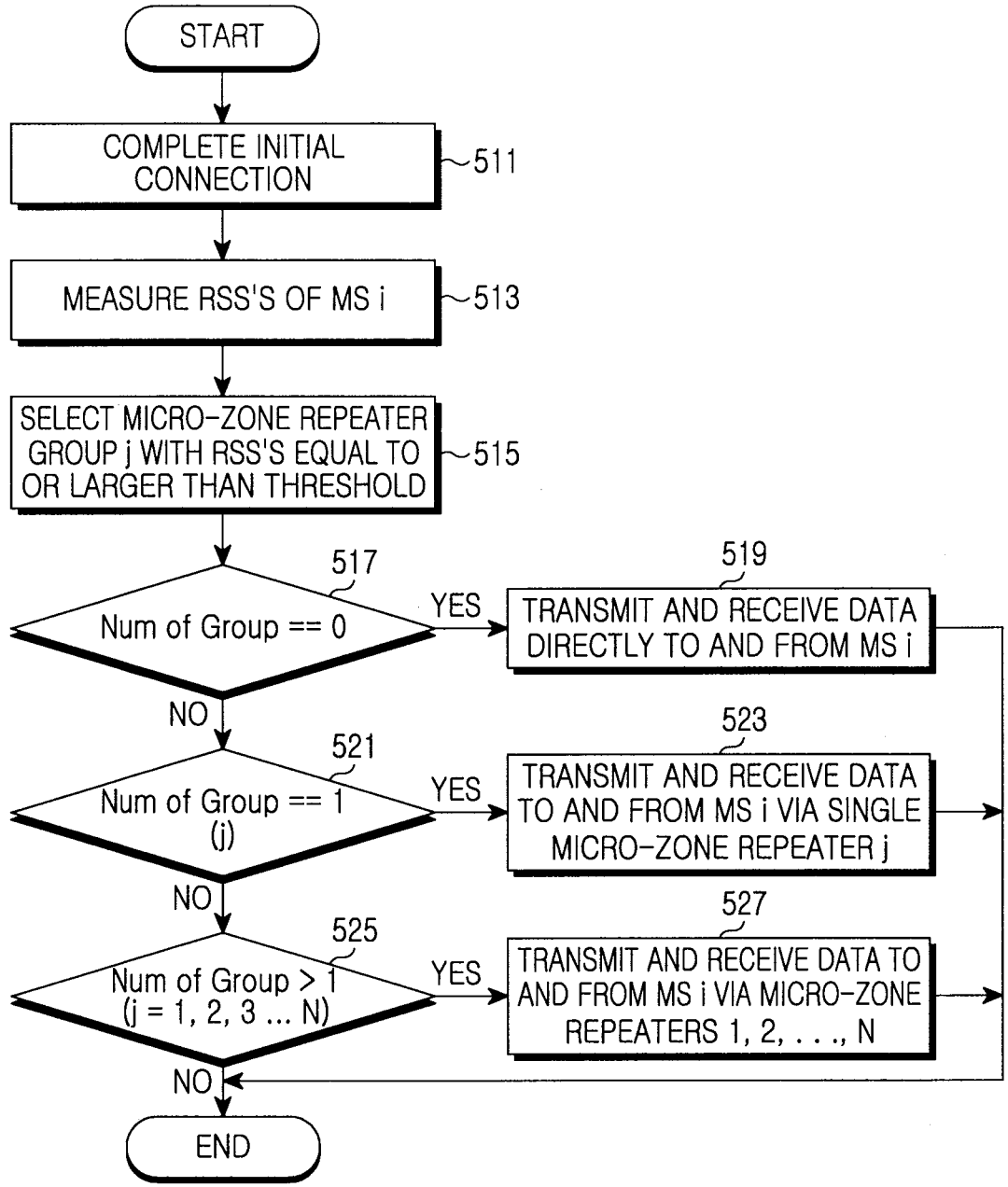
FIG. 5 is a flowchart illustrating an operation of a BS for selecting micro-zone repeaters to communicate with a Mobile Station (MS) in a communication system according to an exemplary embodiment of the present invention.
Figure 6:
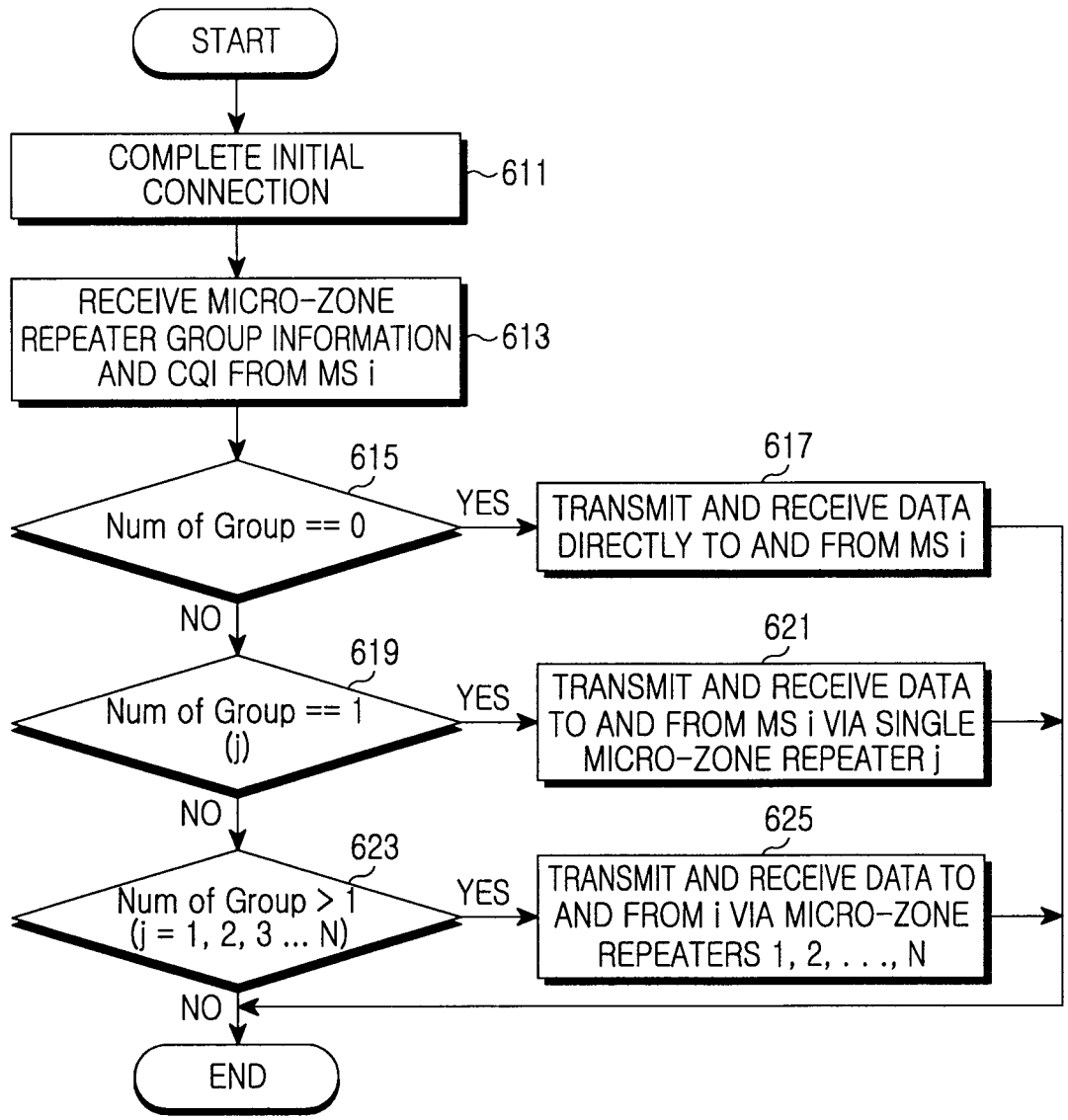
FIG. 6 is a flowchart illustrating an operation of a BS for selecting micro-zone repeaters to communicate with an MS in a communication system according to an exemplary embodiment of the present invention.

To transmit data in the micro zone, the macro BS selects micro-zone repeaters. With reference to FIGS. 5 and 6, an operation of the macro BS for selecting micro-zone repeaters to communicate with the macro BS in order to transmit and receive data to and from an MS will be described below.

FIG. 5 is a flowchart illustrating an operation of a BS for selecting micro-zone repeaters to communicate with an MS in a communication system according to an exemplary embodiment of the present invention.

Referring to FIG. 5, the macro BS completes an initial connection for communications with the MS (MS i) in step 511.

The macro BS measures the Received Signal Strengths (RSSs) of MS i in step 513. More specifically, the macro BS measures the RSSs of MS i at the antennas of micro-zone repeater communicating with the macro BS. Assuming that the index of a micro zone-repeater is denoted by j, then the RSSs can be represented as RSSij. While the description is made in the context of RSS, the RSS can be replaced by CINR.

In step 515, the macro BS selects a group of micro-zone repeaters j having RSSs equal to or larger than a predefined threshold.

The macro BS compares the number of the micro-zone repeaters in the selected group with 0 (Num of Group==0) in step 517.

If the number of the micro-zone repeaters in the selected group is 0, the macro BS transmits and receives data to and from MS i directly in step 519. Herein, the macro BS can use micro-zone repeaters adjacent to the MS as well, for data transmission and reception to and from the MS. For example, one or more micro-zone repeaters transmit the same or different data to the MS in the micro zones of their frames. In the former case, they can adopt beamforming and in the latter case, they can operate in Multiple Input Multiple Output (MIMO).

On the contrary, if the number of the micro-zone repeaters in the selected group is not 0 in step 517, the macro BS compares the number of the micro-zone repeaters with 1 (Num of Group==1) in step 521.

If the selected group comprises a single micro-zone repeater, the macro BS transmits and receives data to and from the MS via the micro-zone repeater j of the selected group in step 523.

If the number of the micro-zone repeaters in the selected group is not 1, the macro BS determines whether the selected group comprises two or more micro-zone repeaters (Num of Group>1) in step 525.

If the selected group comprises two or more micro-zone repeaters, the macro BS transmits and receives data to and from the MS via the micro-zone repeaters of the selected group, for example, micro-zone repeater 1 to micro-zone repeater N in step 527. That is, the data transmission and reception is done via all micro-zone repeaters of the selected group.

If the number of the micro-zone repeaters in the selected group does not exceed 1 in step 525, the macro BS ends the procedure.

In FIG. 5, the macro BS can transmit and receive data to and from the MS without signaling for selection of micro-zone repeaters. Also, the macro BS can communicate with the MS even though the MS cannot identify the selected micro-zone repeaters.

FIG. 6 is a flowchart illustrating an operation of a BS for selecting micro-zone repeaters to communicate with an MS in a communication system according to an exemplary embodiment of the present invention.

Referring to FIG. 6, the macro BS completes an initial connection for communications with the MS (MS i) in step 611.

The macro BS receives micro-zone repeater group information and Channel Quality Information (CQI) measured with respect to the macro BS from MS i in step 613.

To be more specific, MS i measures the RSSs of micro-zone repeaters and selects micro-zone repeaters having RSSs larger than a predefined threshold. MS i groups the selected micro-zone repeaters and transmits information about the micro-zone repeater group to the macro BS.

The CQI is measured about each micro-zone repeater of the micro-zone repeater group. A BS scheduler can use the CQI to maximize capacity or acquire PF metrics.

In step 615, the macro BS compares the number of the micro-zone repeaters in the selected group with 0 (Num of Group==0).

If the number of the micro-zone repeaters in the selected group is 0, the macro BS transmits and receives data to and from MS i directly in step 617. Herein, the macro BS can use micro-zone repeaters adjacent to the MS as well, for data transmission and reception to and from the MS. For example, one or more micro-zone repeaters transmit the same or different data to the MS in the micro zones of their frames. In the former case, they can adopt beamforming and in the latter case, they can operate in MIMO.

In contrast, if the number of the micro-zone repeaters in the selected group is not 0 in step 615, the macro BS compares the number of the micro-zone repeaters with 1 (Num of Group==1) in step 619.

If the selected group comprises a single micro-zone repeater, the macro BS transmits and receives data to and from the MS via the micro-zone repeater j of the selected group in step 621.

If the number of the micro-zone repeaters in the selected group is not 1 in step 619, the macro BS determines whether the selected group comprises two or more micro-zone repeaters (Num of Group>1) in step 623.

If the selected group comprises two or more micro-zone repeaters, the macro BS transmits and receives data to and from the MS via the micro-zone repeaters of the selected group, for example, micro-zone repeater 1 to micro-zone repeater N in step 625. That is, the data transmission and reception is done via all micro-zone repeaters of the selected group.

If the number of the micro-zone repeaters in the selected group does not exceed 1 in step 623, the macro BS ends the procedure.

In FIG. 6, when the macro BS selects micro-zone repeaters to communicate with the MS, consumption of unnecessary UL resources can be prevented.

In FIGS. 5 and 6, the macro BS is responsible for selecting micro-zone repeaters to communicate with the MS.

The data transmission/reception schemes illustrated in FIGS. 5 and 6 can apply to DL/UL data transmission/reception between the macro BS and the MS. For example, the UL data transmission/reception may be performed in the data transmission/reception scheme of FIG. 5 and the DL data transmission/reception may be performed in the data transmission/reception scheme of FIG. 6, or vice versa.

The micro-zone repeater group for use in data transmission/reception between the macro BS and the MS will be described below with reference to FIGS. 7A and 7B.

Figure 7A:
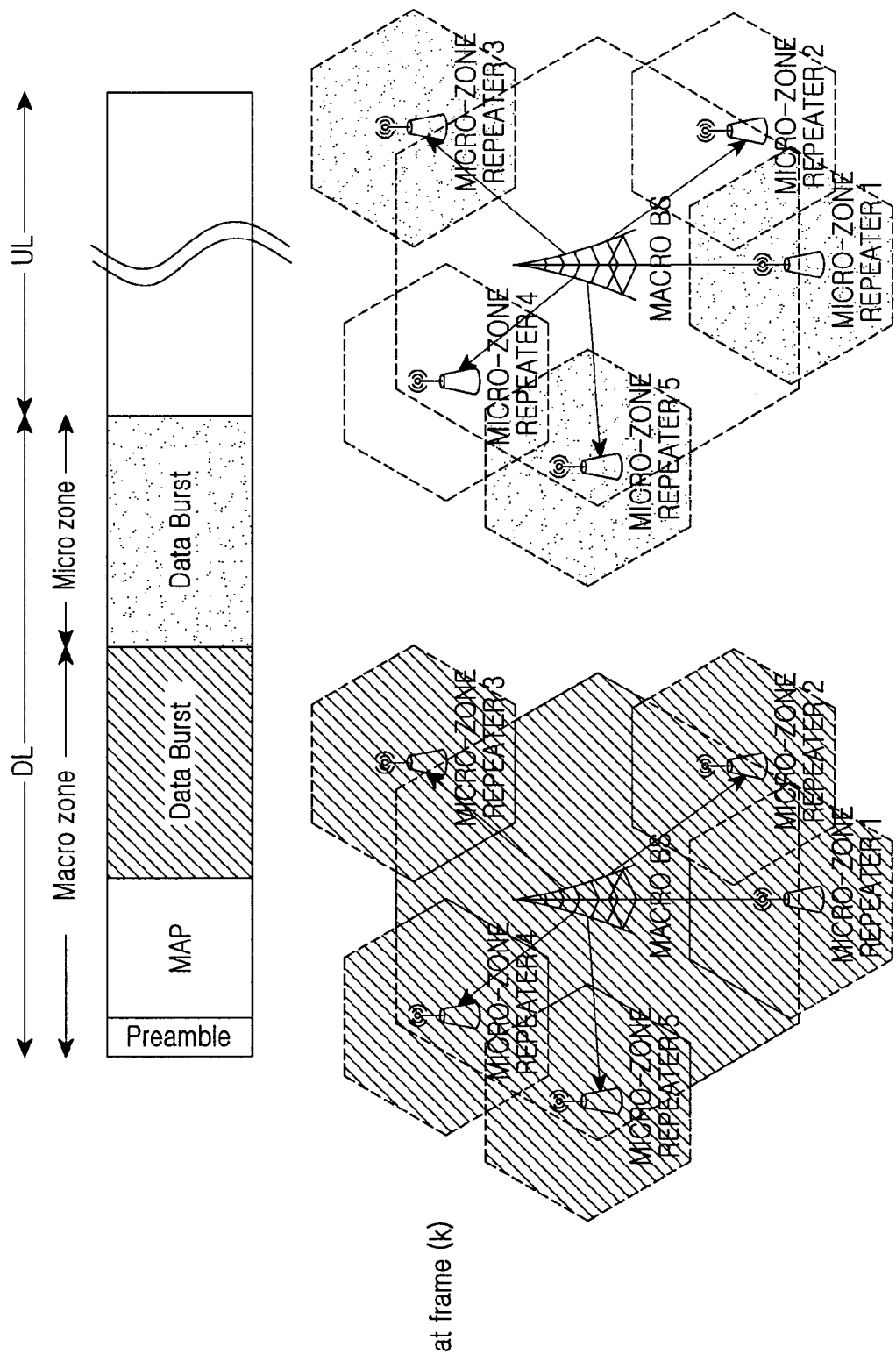
FIG. 7A illustrates a micro-zone repeater group that is involved in data transmission from a BS to an MS in a $k^{th}$ frame in a communication system according to an exemplary embodiment of the present invention.

FIG. 7A illustrates a micro-zone repeater group that is involved in data transmission from a BS to a MS in a $k^{th}$ frame in a communication system according to an exemplary embodiment of the present invention.

Referring to FIG. 7A, the BS has selected the micro-zone repeater group for data transmission to the MS. In the illustrated case of FIG. 7A, the macro BS transmits data to the MS in the macro zone and the micro zone of a $k^{th}$ frame.

The $k^{th}$ frame comprises a preamble, a MAP and data bursts in the macro zone. In the macro zone, the macro BS and each micro-zone repeater transmit the same data.

In the micro zone, first, third and fifth micro-zone repeaters of the micro-zone repeater group selected by the macro BS transmit data to the MS. According to an exemplary embodiment of the present invention, the micro-zone repeaters are isolated from one another, that is, there is no interference among them during data transmission in the micro zone.

Figure 7B:
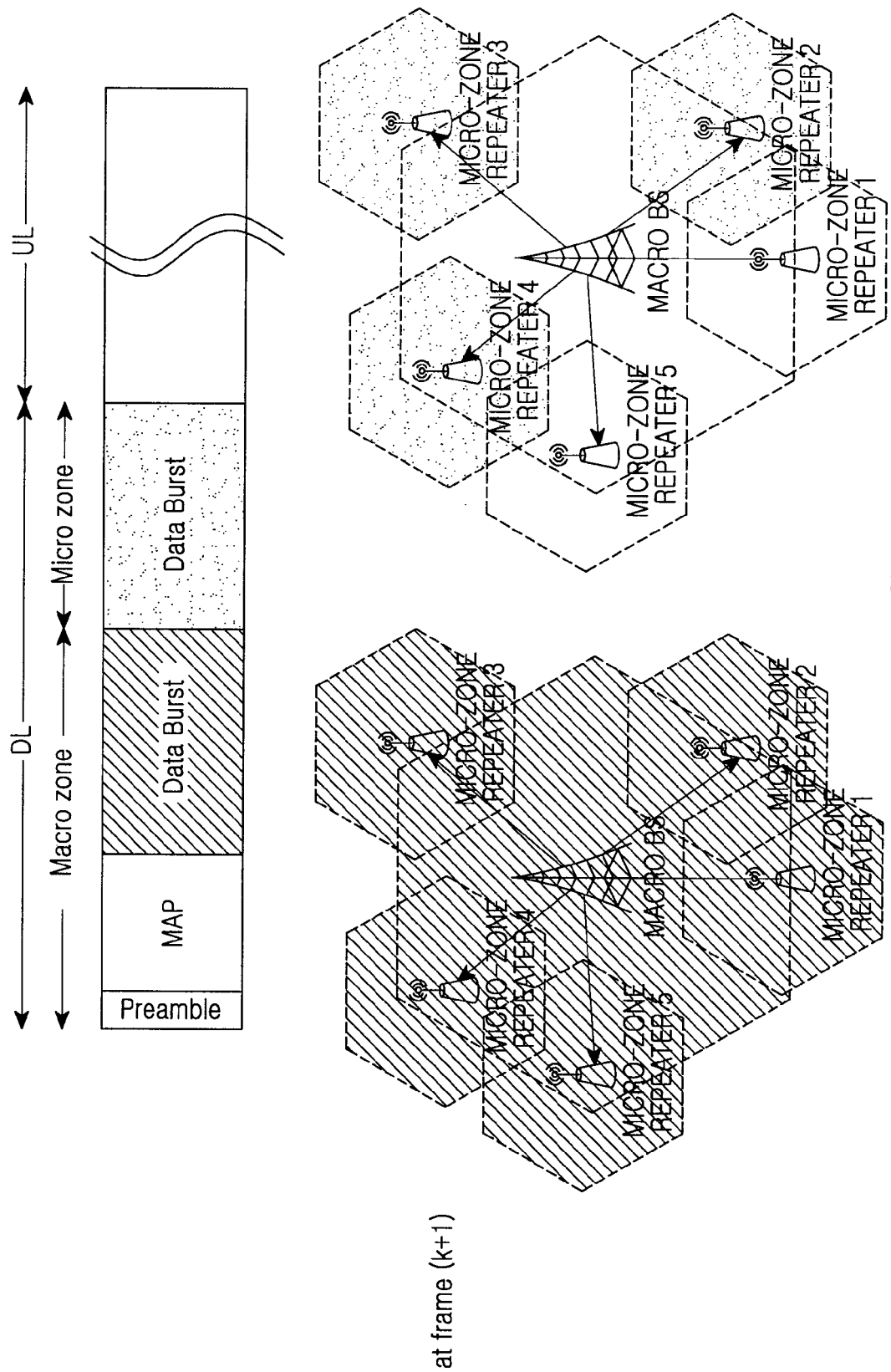
FIG. 7B illustrates a micro-zone repeater group that is involved in data transmission from a BS to an MS in a $(k+1)^{th}$ frame in a communication system according to an exemplary embodiment of the present invention.

FIG. 7B illustrates a micro-zone repeater group that is involved in data transmission from a BS to a MS in a $(k+1)^{th}$ frame in a communication system according to an exemplary embodiment of the present invention.

Referring to FIG. 7B, the BS has selected the micro-zone repeater groups for data transmission to the MS. In the illustrated case of FIG. 7B, the macro BS transmits data to the MS in the macro zone and the micro zone of a $(k+1)^{th}$ frame.

The $(k+1)^{th}$ frame comprises a preamble, a MAP and data bursts in the macro zone. In the macro zone, the macro BS and each micro-zone repeater transmit the same data.

In the micro zone, second, third and fourth micro-zone repeaters of the micro-zone repeater group selected by the macro BS transmit data to the MS. According to an exemplary embodiment of the present invention, the micro-zone repeaters are isolated from one another, that is, there is no interference among them during data transmission in the micro zone.

In FIGS. 7A and 7B, the micro-zone repeaters transmit data in the micro zone, isolated from one another. That is, only micro-zone repeaters that minimize mutual interference are selected for data transmission in the micro zone.

The other micro-zone repeaters excluded from the micro-zone repeater group transmit null data or do not transmit any data in accordance with an exemplary embodiment of the present invention.

As described above, when all repeaters transmit the same data in a communication system using repeaters, an increase in the number of repeaters leads to increased CINRs, which in turn increases system capacity. Meanwhile, if micro-zone repeaters are used, they can transmit different data. Even in this case, CINRs can be increased and data capacity can be maximized with additional use of resources.

In the communication system using micro-zone repeaters, spatial resources can be increased by using more micro-zone repeaters. However, low isolation among micro-zone repeaters decreases CINRs due to interference from other micro-zone repeaters. As a consequence, system capacity can be decreased.

Accordingly, an exemplary embodiment of the present invention generates micro-zone repeater groups with isolated micro-zone repeater antennas and transmits data via micro-zone repeaters scheduled for a current frame or band. In addition, an exemplary embodiment of the present invention selects micro-zone repeater groups by use of a predefined metric and schedules the micro-zone repeater groups.

Figure 8:
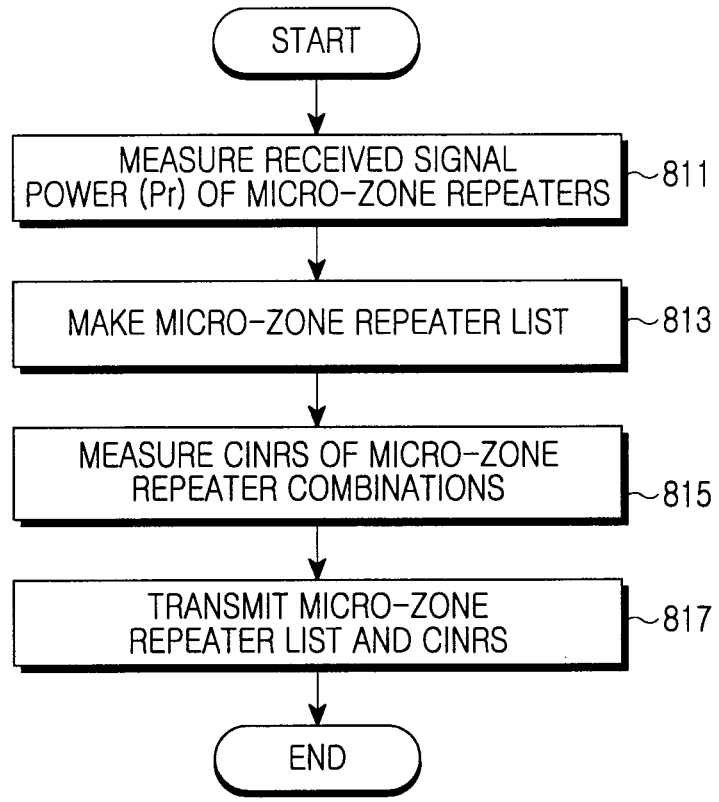
FIG. 8 is a flowchart illustrating an operation of a MS for selecting micro-zone repeaters according to an exemplary embodiment of the present invention.
Figure 9:
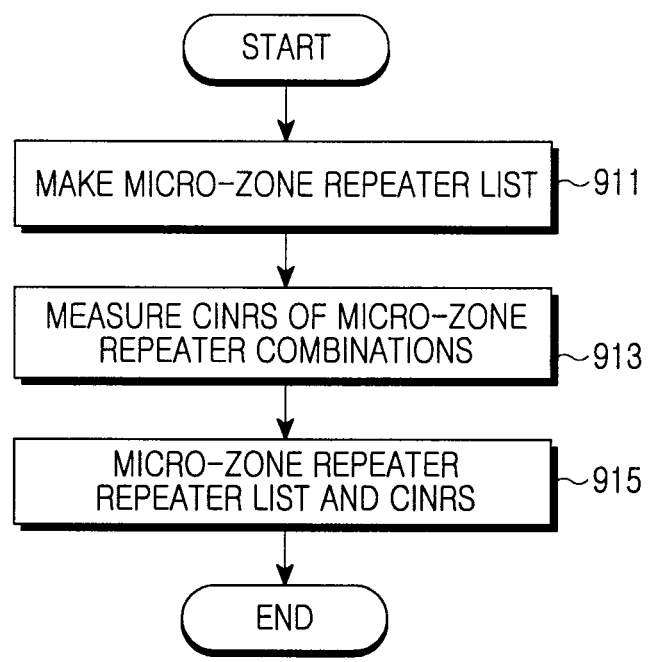
FIG. 9 is a flowchart illustrating an operation of a MS for selecting micro-zone repeaters according to an exemplary embodiment of the present invention.

With reference to FIGS. 8 and 9, operations of the macro BS and the MS for selecting a micro-zone repeater group will be described below.

FIG. 8 is a flowchart illustrating an operation of a MS for selecting micro-zone repeaters according to an exemplary embodiment of the present invention.

Referring to FIG. 8, the MS measures the reception signal power levels Pr of micro-zone repeaters in step 811.

In step 813, the MS generates a list of micro-zone repeaters with reception signal power levels Pr larger than a predefined threshold Pth (Pr>Pth).

The MS measures the CINRs of every micro-zone repeater combination k that can be produced from the micro-zone repeater list in step 815. The CINRs can be expressed as $CINR_{j,k}$ where j denotes the index of the MS and k denotes the micro-zone repeater combination. The micro-zone repeater combination k may comprise one or more micro-zone repeaters.

In step 817, the MS transmits the micro-zone repeater list and $CINR_{j,k}$ to its serving macro BS. The micro-zone repeater list and $CINR_{j,k}$ can be transmitted to the serving macro BS in the micro zone.

FIG. 9 is a flowchart illustrating an operation of a MS for selecting micro-zone repeaters according to an exemplary embodiment of the present invention.

Referring to FIG. 9, the MS generates a list of all micro-zone repeaters within the coverage area of its serving macro BS in step 911.

The MS measures the CINRs of every possible micro-zone repeater combination m that can be produced from the micro-zone repeater list in step 913. The CINRs can be expressed as $CINR_{j,m}$ where j denotes the index of the MS and m denotes the micro-zone repeater combination.

For example, on the assumption that the micro-zone repeater list comprises three micro zone-repeaters A, B and C and micro-zone repeater A is a serving micro-zone repeater, the micro-zone repeater combinations that can be produced using the micro-zone repeater list can be created as illustrated in Table 1.

TABLE 1

| Case | Repeater A | Repeater B | Repeater C |
|---|---|---|---|
| 1 | O | O | O |
| 2 | O | O | * |
| 3 | O | * | O |
| 4 | O | * | * |
| 5 | O | O | X |
| 6 | O | X | O |
| 7 | O | X | X |

In Table 1, O indicates that the micro-zone repeater transmits data to MS j, * indicates that the micro-zone repeater transmits data to another MS, and X indicates that the micro-zone repeater does not transmit data.

The MS measures the CINRs of each case listed in Table 1, $CINR_{j,m}$.

In step 915, the MS transmits the micro-zone repeater list and $CINR_{j,m}$ to its serving macro BS. The micro-zone repeater list and $CINR_{j,k}$ can be transmitted to the serving macro BS in the micro zone.

While FIGS. 8 and 9 have been described in the context of CINR by way of example, the CINR can be replaced with any one or combination of other CQI, for example, Signal-to-Noise Ratio (SNR), Signal-to-Interference and Noise Ratio (SINR), or Carrier-to-Interference Ratio (CIR). In addition, the DL/UL RSS of the MS can substitute for the CINR.

In addition, while it has been described in the exemplary embodiments of the present invention that the MS transmits a micro-zone repeater list to the macro BS, it can be further contemplated that instead of the micro-zone repeater list, the MS transmits a list of micro-zone repeater combinations produced using the micro-zone repeater list.

Figure 10:
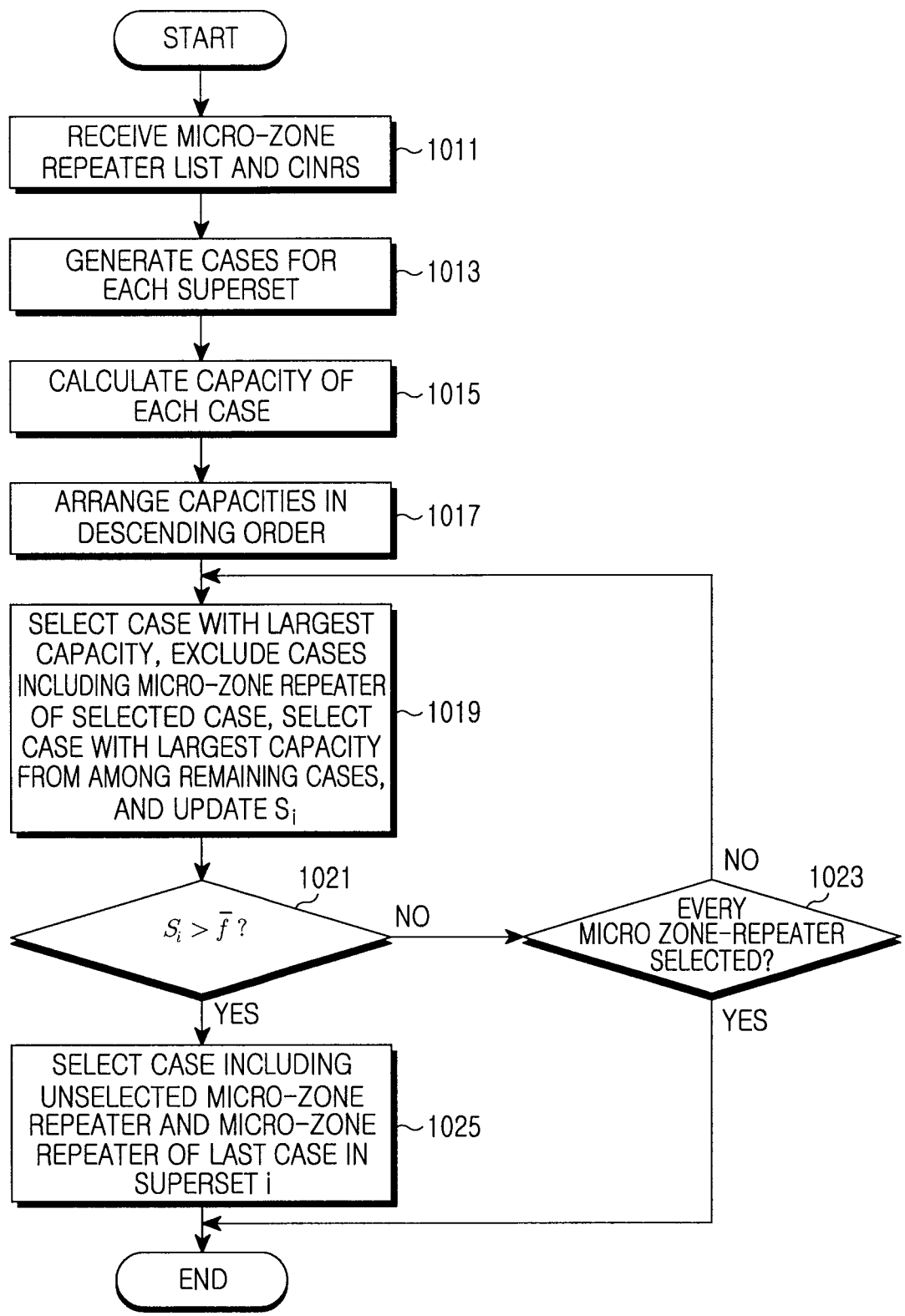
FIG. 10 is a flowchart illustrating an operation of a BS for selecting micro-zone repeaters according to an exemplary embodiment of the present invention.

FIG. 10 is a flowchart illustrating an operation of a macro BS for selecting micro-zone repeaters according to an exemplary embodiment of the present invention.

Referring to FIG. 10, the macro BS receives a micro-zone repeater list and CINRs in step 1011. The CINRs can be $CINR_{j,k}$ or $CINR_{j,m}$.

In step 1013, the macro BS generates cases (case i) for each super-set.

The super-set refers to a set of micro-zone repeater combinations with high isolation levels selected from among the micro-zone repeater combinations that are produced using the micro-zone repeater list. The macro BS creates cases using the micro-zone repeaters of the super-set. When creating cases, the macro BS limits the number of micro-zone repeaters in a micro-zone repeater combination that can transmit and receive data simultaneously with the macro BS within the capacity of its modem.

In step 1015, the macro BS calculates the capacity of each case by $$C_{s,i} = \alpha_i \sum_j \log(1 + CINR_{j,k}) \cdot \frac{1}{O_{j,k}} \quad (1)$$

where $C_{s,i}$ denotes the capacity of case i in the superset, $\alpha_i$ denotes a weight for case i, $CINR_{j,k}$ denotes the CINRs received from MS j, and $O_{j,k}$ denotes the number of overlays for $CINR_{j,k}$, i.e. the number of micro-zone repeaters comprised in a micro-zone repeater group.

In step 1017, the macro BS arranges the capacities $C_{s,i}$ in a descending order.

The macro BS selects a case with the largest capacity, excludes cases that each comprise at least one micro-zone repeater comprised in the selected case, selects a case with the largest capacity from among the remaining cases, and updates the number of selected cases $S_i$ for superset i ($S_i=S_i+1$) in step 1019.

In step 1021, the macro BS compares the number of selected cases $S_i$ with a minimum frame number $\bar{T}$. If $S_i$ is larger than $\bar{T}$, Quality of Service (QoS) cannot be guaranteed for each MS. Therefore, even through $S_i$ is equal to $\bar{T}(S_i=\bar{T})$, when there is an unselected micro-zone repeater, a case including the unselected micro-zone repeater is selected so that every micro-zone repeater can be comprised in cases.

If $S_i$ is equal to or less than $\bar{T}$, the macro BS goes to step 1023. If $S_i$ is larger than $\bar{T}$, the macro BS goes to step 1025.

In step 1025, the macro BS selects a case including a currently unselected micro-zone repeater and at least one micro-zone repeater of the last case in superset i. Thereafter, the macro BS ends the procedure.

In step 1023, the macro BS determines whether every micro-zone repeater has been selected.

If every micro-zone repeater has been selected, the macro BS ends the procedure. If there is still an unselected micro-zone repeater, the macro BS returns to step 1019.

Now a method for scheduling available micro-zone repeater groups in the macro BS will be described with reference to FIG. 11.

Figure 11:
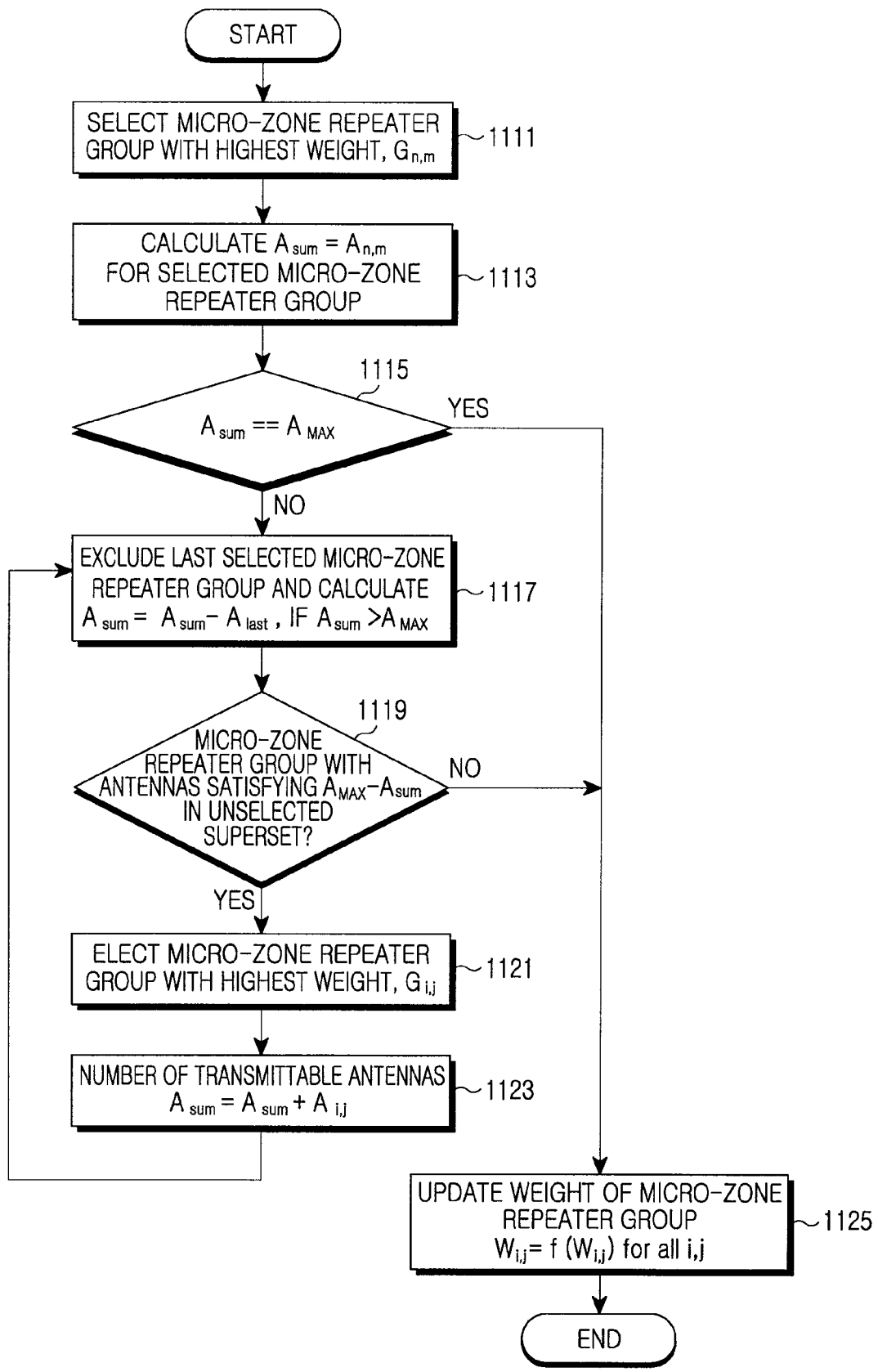
FIG. 11 is a flowchart illustrating an operation of a BS for scheduling available micro-zone repeater groups according to an exemplary embodiment of the present invention.

FIG. 11 is a flowchart illustrating an operation of a BS for scheduling available micro-zone repeater groups according to an exemplary embodiment of the present invention.

Referring to FIG. 11, the macro BS selects a micro-zone repeater group $G_{n,m}$ having the highest weight in step 1111. If an $m^{th}$ selected case in superset n is referred to as case m, case m, i.e. the micro-zone repeater group corresponding to case m is denoted by $G_{n,m}$. The weight of the micro-zone repeater group $G_{n,m}$ is determined according to its QoS and system capacity.

The macro BS calculates its required processing capability $A_{sum}$ to process the selected micro-zone repeater group in step 1113. When the required processing capability of the macro BS for the selected micro-zone repeater group is denoted by $A_{m,n}$, $A_{sum}=A_{m,n}$. The required processing capability can be the number of micro-zone repeater antennas or the number of MSs that can be processed in the macro BS. Herein, the required processing capability is the number of micro-zone repeater antennas that can be processed in the macro BS.

In step 1115, the macro BS compares the required processing capability $A_{sum}$ with its maximum processing capability $A_{MAX}$ ($A_{sum}=A_{MAX}$). If the required processing capability satisfies the maximum processing capability, the macro BS goes to step 1125 and otherwise, it goes to step 1117.

If $A_{sum}>A_{MAX}$, the macro BS excludes the last selected micro-zone repeater group and re-calculates the resulting required processing capability ($A_{sum}=A_{sum}-A_{last}$ where $A_{last}$ denotes a processing capability required for the last selected micro-zone repeater group) in step 1117. The macro BS repeats the selection of a micro-zone repeater group, taking into account the capability of the modem as well as the highest weight. The above operation is for excluding the last selected micro-zone repeater group.

In step 1119, the macro BS determines whether there is a micro-zone repeater group with antennas, the number of which, satisfies ($A_{MAX}-A_{sum}$) in an unselected superset.

In the absence of the micro-zone repeater group, the macro BS proceeds to step 1125. On the other hand, in the presence of the micro-zone repeater group, the macro BS proceeds to step 1121.

The macro BS selects a micro-zone repeater group $G_{i,j}$ having the highest weight in step 1121 and adds the processing capability $A_{i,j}$ required for $G_{i,j}$ to $A_{sum}$ ($A_{sum}=A_{sum}+A_{i,j}$) in step 1123. Then the macro BS returns to step 1117.

In step 1125, the macro BS updates the weight of the selected micro-zone repeater group $G_{i,j}$, i.e. $W_{i,j}=f(W_{i,j})$ for all i,j.

While one frame is divided into a macro zone and a micro zone in exemplary embodiments of the present invention, it can be further contemplated that the macro zone and the micro zone can be defined on the basis of a plurality of frames.

As is apparent from the above description, exemplary embodiments of the present invention advantageously increases the system capacity of a communication system using repeaters. Especially as a frame is divided into two zones for data transmission and data is scheduled for each zone, exemplary embodiments of the present invention can control interference between repeaters during data transmission and reception.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for transmitting data by a remote unit among a plurality of remote units in a communication system, the method comprising:
   transmitting data, by the remote unit, to at least one mobile station (MS) through a downlink (DL) frame having a DL frame structure common to the plurality of remote units,
   wherein the DL frame structure includes a first zone and a second zone, the first zone being used to transmit the same data in the same transmission resource by the plurality of remote units, and the second zone being used to transmit, in the same transmission resource, data by at least one of the plurality of remote units that is different than data transmitted by at least another one of the plurality of remote units, and
   wherein the transmission resource comprises time and frequency resources.

2. The method of claim 1, wherein at least one of the plurality of remote units are one of wirelessly connected and connected by cable to a central unit that provides the data in the first zone and the second zone to the plurality of remote units.

3. The method of claim 1, wherein the same data includes at least one of control information including a preamble and a MAP, and data bursts.

4. The method of claim 1, wherein the first zone and the second zone is determined by dividing the DL frame structure according to a time or a frequency, the first zone being used to transmit the same data in the same time or the same frequency by the plurality of remote units, and the second zone being used to transmit the different data in a different time or a different frequency by the plurality of remote units.

5. A method for transmitting data by a base station (BS) in a communication system, the method comprising:
   transmitting data to at least one repeater through a downlink (DL) frame, wherein the DL frame includes a first zone and a second zone, the first zone being used to transmit the same data in the same transmission resource by the BS and the at least one repeater, and the second zone being used to transmit different data in the same transmission resource by the BS and the at least one repeater, and wherein the transmitting of the data comprises:

selecting the at least one repeater for performing a communication with a mobile station (MS), from among a plurality of repeaters;

determining whether data transmission to the at least one repeater is needed;

transmitting the data directly to the MS, if the data transmission to the at least one repeater is not needed; and transmitting the data to the MS through the at least one repeater, if the data transmission to the at least one repeater is needed, and wherein the transmission resource comprises time and frequency resources.

6. The method of claim 5, wherein the selecting of the at least one repeater comprises selecting the at least one repeater based on repeater selecting information and channel quality information (CQI) about channel qualities between the MS and repeaters connected to the MS, the repeater selecting information and the CQI being received from the MS.

7. The method of claim 5, wherein the selecting of the at least one repeater comprises selecting the at least one repeater with a signal strength measured by the MS larger than a threshold, from among the plurality of repeaters.

8. The method of claim 5, wherein the selecting of the at least one repeater comprises selecting repeaters with minimal mutual interference from among the plurality of repeaters.

9. The method of claim 5, wherein the selecting of the at least one repeater comprises:

receiving, from the MS, a repeater list, including the plurality of repeaters within a coverage area of the BS and channel quality information (CQI) of each of the plurality of repeaters;

calculating a capacity of each repeater included in the repeater list; and selecting a repeater with a largest capacity from among the plurality of repeaters, based on a result of the calculation.

10. A method for receiving data by a mobile station (MS) from a remote unit among a plurality of remote units in a communication system, the method comprising:

receiving data, by the MS, transmitted by the remote unit through a downlink (DL) frame having a DL frame structure common to the plurality of remote units, wherein the DL frame structure includes a first zone and a second zone, the first zone being used to transmit the same data in the same transmission resource by the plurality of remote units, and the second zone being used to transmit, in the same transmission resource, data by at least one of the plurality of remote units that is different than data transmitted by at least another one of the plurality of remote units, and wherein the transmission resource comprises time and frequency resources.

11. The method of claim 10, wherein the same data includes at least one of control information including a preamble and a MAP, and data bursts.

12. The method of claim 10, wherein the first zone and the second zone is determined by dividing the DL frame structure according to a time or a frequency, the first zone being used to transmit the same data in the same time or the same frequency by the plurality of remote units, and the second zone being used to transmit the different data in a different time or a different frequency by the plurality of remote units.

13. A remote unit among a plurality of remote units in a communication system, the remote unit comprising:

a transmitter configured to transmit data to at least one mobile station (MS) through a downlink (DL) frame having a DL frame structure common to the plurality of remote units, wherein the DL frame structure includes a first zone and a second zone, the first zone being used to transmit the same data in the same transmission resource and the plurality of remote units, and the second zone being used to transmit, in the same transmission resource, data by at least one of the plurality of remote units that is different than data transmitted by at least another one of the plurality of remote units, and wherein the transmission resource comprises time and frequency resources.

14. The remote unit of claim 13, wherein at least one of the plurality of remote units are one of wirelessly connected and connected by cable to a central unit that provides the data in the first zone and the second zone to the plurality of remote units.

15. The remote unit of claim 13, wherein the same data includes at least one of control information including a preamble and a MAP, and data bursts.

16. The remote unit of claim 13, wherein the first zone and the second zone is determined by dividing the DL frame structure according to a time or a frequency, the first zone being used to transmit the same data in the same time or the same frequency by the plurality of remote units, and the second zone being used to transmit the different data in a different time or a different frequency by the plurality of remote units.

17. A base station (BS) in a communication system, the BS comprising:

a transmitter configured to transmit data to at least one repeater through a downlink (DL) frame, wherein the DL frame includes a first zone and a second zone, the first zone being used to transmit the same data in the same transmission resource by the BS and the at least one repeater, and the second zone being used to transmit different data in the same transmission resource by the BS and the at least one repeater; and a controller configured to select the at least one repeater for performing a communication with a mobile station (MS), from among a plurality of repeaters, to determine whether data transmission to the at least one repeater is needed, to control the transmitter to transmit the data directly to the MS, if the data transmission to the at least one repeater is not needed, and to control the transmitter to transmit the data to the MS through the at least one repeater, if the data transmission to the at least one repeater is needed, and wherein the transmission resource comprises time and frequency resources.

18. The BS of claim 17, wherein the controller selects the at least one repeater based on repeater selecting information and channel quality information (CQI) about channel qualities between the MS and repeaters connected to the MS, the repeater selecting information and the CQI being received from the MS.

19. The BS of claim 17, wherein the controller selects the at least one repeater with a signal strength measured by the MS larger than a threshold, from among the plurality of repeaters.

20. The BS of claim 17, wherein the controller selects repeaters with minimal mutual interference from among the plurality of repeaters.

21. The BS of claim 17, further comprising a receiver for receiving a repeater list including the plurality of repeaters within a coverage area of the BS and channel quality information (CQI) of each of the plurality of repeaters, wherein the controller calculates a capacity of each repeater included in the repeater list, and selects a repeater with a largest capacity from among the plurality of repeaters, based on a result of the calculation.

22. A mobile station (MS) from a remote unit among a plurality of remote units in a communication system, the MS comprising:

a receiver configure to receive first data transmitted by the remote unit through a downlink (DL) frame having a DL frame structure common to the plurality of remote units, wherein the DL frame structure includes a first zone and a second zone, the first zone being used to transmit the same data in the same transmission resource by the plurality of remote units, and the second zone being used to transmit, in the same transmission resource, data by at least one of the plurality of remote units that is different than data transmitted by at least another one of the plurality of remote units, and wherein the transmission resource comprises time and frequency resources.

23. The MS of claim 22, wherein the same data includes at least one of control information including a preamble and a MAP, and data bursts.

24. The MS of claim 22, wherein the first zone and the second zone is determined by dividing the DL frame structure according to a time or a frequency, the first zone being used to transmit the same data in the same time or the same frequency by the plurality of remote units, and the second zone being used to transmit the different data in a different time or a different frequency by the plurality of remote units.

* * * * *